United States Patent
Park et al.

(10) Patent No.: US 7,477,584 B2
(45) Date of Patent: Jan. 13, 2009

(54) RECORDING AND/OR REPRODUCING APPARATUS AND METHOD WITH A SIGNAL QUALITY DETERMINING DEVICE AND METHOD

(75) Inventors: Hyun-soo Park, Seoul (KR); Jae-wook Lee, Osan-si (KR); Jae-seong Shim, Seoul (KR); Jung-hyun Lee, Seoul (KR); Eing-seob Cho, Yongin-si (KR); Eun-jin Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 786 days.

(21) Appl. No.: 10/985,014

(22) Filed: Nov. 10, 2004

(65) Prior Publication Data

US 2005/0128916 A1 Jun. 16, 2005

(30) Foreign Application Priority Data

Nov. 11, 2003 (KR) .................. 10-2003-0079595
Aug. 16, 2004 (KR) .................. 10-2004-0064227

(51) Int. Cl.
  *G11B 7/00* (2006.01)
(52) U.S. Cl. .................. 369/53.31; 369/59.21
(58) Field of Classification Search .................. None
  See application file for complete search history.

(56) References Cited

U.S. PATENT DOCUMENTS

| | | | | |
|---|---|---|---|---|
| 5,442,618 A | * | 8/1995 | Dewey et al. ............ | 369/53.33 |
| 5,587,980 A | * | 12/1996 | Kablau et al. ............ | 369/53.31 |
| 6,813,485 B2 | * | 11/2004 | Sorrells et al. ............ | 455/313 |
| 6,920,100 B2 | * | 7/2005 | Kuma et al. ............ | 369/59.21 |
| 6,925,041 B2 | * | 8/2005 | Kai et al. ............ | 369/47.51 |
| 6,940,800 B2 | * | 9/2005 | Fujimoto et al. ............ | 369/59.22 |

(Continued)

FOREIGN PATENT DOCUMENTS

JP 7-29311 1/1995

(Continued)

OTHER PUBLICATIONS

Office Action issued in Taiwanese Patent Application No. 93134223 on May 16, 2008.

*Primary Examiner*—Peter Vincent Agustin
(74) *Attorney, Agent, or Firm*—Stein, McEwen & Bui, LLP

(57) ABSTRACT

A recording and/or reproducing apparatus and method with signal quality determining device and a method thereof, with the signal quality determining device including a signal estimator determining a level corresponding to a sample value of the RF signal using binary data obtained from the RF signal and generating a selection signal corresponding to the determined level, a channel identifier classifying the sample value into a plurality of levels according to the selection signal and obtaining an average value of the sample values classified into each level, and a quality calculator outputting a signal quality value representing quality of the RF signal using each sample value output from the channel identifier and the average value of the sample values classified into each level. Accordingly, quality of an RF signal can be determined more exactly, and focus compensation, tilt compensation, detrack compensation, and recording signal optimization can be performed using the determined signal quality.

16 Claims, 8 Drawing Sheets

U.S. PATENT DOCUMENTS

| | | | |
|---|---|---|---|
| 6,999,394 B2 * | 2/2006 | Urita et al. | 369/59.21 |
| 2001/0000694 A1 | 5/2001 | Sugasawa et al. | |
| 2003/0043713 A1 | 3/2003 | Takeda | |
| 2003/0090980 A1 * | 5/2003 | Kashihara et al. | 369/53.31 |

FOREIGN PATENT DOCUMENTS

| | | |
|---|---|---|
| JP | 2002-298394 | 10/2002 |
| JP | 2003-67926 | 3/2003 |

* cited by examiner

RECORDING AND/OR REPRODUCING APPARATUS AND METHOD WITH A SIGNAL QUALITY DETERMINING DEVICE AND METHOD

CROSS-REFERENCE TO RELATED APPLICATIONS

This application claims the priority benefit of Korean Patent Application No. 2003-79595, filed on Nov. 11, 2003, and No. 2004-64227, filed on Aug. 16, 2004, in the Korean Intellectual Property Office, the disclosures of which are incorporated herein in their entirety by reference.

BACKGROUND OF THE INVENTION

1. Field of the Invention

Embodiments of the present invention relate to recording and/or reproducing apparatuses with signal quality determining devices and methods therefor, and more particularly, to methods devices for determining the quality of RF signals obtained from an optical disc.

2. Description of the Related Art

Binary data recorded on an optical disc can be reproduced by a recording and/or reproducing apparatus, having the capability to receive, convert, and analyze a reflected light beam, e.g., converting a light beam reflected from the optical disc into an electrical signal, performing a predetermined signal processing process on the electrical signal, and reproducing the information. The signal obtained by converting the light beam reflected from the optical disc into the electrical signal is called a radio frequency (RF) signal. Even though the data recorded on the optical disc is binary data, the RF signal obtained from the optical disc is an analog signal, due to the characteristics of the optical disc and optical characteristics. Therefore, a binarization process is required to convert the analog signal into a binary signal.

FIG. 1 is a block diagram of a conventional binarization device. This conventional binarization device includes a comparator 110 and a lowpass filter 130. The comparator 110 outputs a binary signal by binarizing an input RF signal based on a standard value provided by the lowpass filter 130. The binary signal output from the comparator 110 is provided to a phase locked loop (PLL) (not shown) to generate a system clock. Here, the RF signal and the system clock are not exactly synchronized, and there is a small phase difference between the RF signal and the system clock. This phase difference effect is called jitter.

FIGS. 2A and 2B illustrate jitter generated according to a conventional technology. In the ideal case, an edge of the system clock exactly meets a zero crossing point of the RF signal, as shown in FIG. 2A. However, in actuality, the edge of the system clock does not meet the zero crossing point of the RF signal, and the jitter is evident, as shown in FIG. 2B.

According to conventional techniques, the jitter value, which is the phase difference between an RF signal and a system clock, can be used as a barometer to evaluate the quality of the RF signal. That is, since the jitter value is larger when a large amount of noise is included in the RF signal, the quality of the RF signal can be obtained by measuring the jitter value.

However, as the data recording density of the optical disc increases, the magnitude of the RF signal has become smaller. In this case, since signal distortion is relatively large even when a small amount of noise is present, the jitter value will be large. Also, as the data recording density of the optical disc increases, more zero crossing points are included in the RF signal. Accordingly, a jitter circuit may malfunction.

SUMMARY OF THE INVENTION

Embodiments of the present invention provide methods devices for determining signal quality more exactly and more efficiently in a high density optical disc having high data recording density.

Additional aspects and/or advantages of the invention will be set forth in part in the description which follows and, in part, will be obvious from the description, or may be learned by practice of the invention.

To achieve the above and/or other aspects and advantages, embodiments of the present invention set forth an RF signal quality determining device, including a signal estimator determining a level, corresponding to a sample value of an input RF signal, using binary data obtained from the RF signal and generating a selection signal corresponding to the determined level, a channel identifier classifying the sample value into a plurality of levels, according to the selection signal, and obtaining an average value of sample values classified into each level, and a quality calculator calculating a signal quality value representing a signal quality of the RF signal using each sample value output from the channel identifier and the average value of the sample values classified into each level.

The channel identifier may include a plurality of averaging filters receiving respective sample values classified into respective levels and obtaining an average value of the sample values classified into each level.

In addition, the averaging filters may include a lowpass filter, the signal quality value may be a signal to noise ratio (SNR) calculated using each sample value and the average value of the sample values classified into each level, the signal quality value may be an absolute SNR (ASNR) calculated using each sample value and the average value of the sample values classified into each level, and the signal quality value may be a peak ASNR (PASNR) calculated using each sample value and the average value of the sample values classified into each level. The binary data may also be obtained by viterbi decoding the RF signal.

To achieve the above and/or other aspects and advantages, embodiments of the present invention set forth a method of determining a signal quality of an input RF signal, including determining a level, corresponding to a sample value of the RF signal, using binary data obtained from the RF signal and generating a selection signal corresponding to the determined level, classifying the sample value into a plurality of levels, according to the selection signal, and obtaining an average value of sample values classified into each level, and calculating a signal quality value representing the signal quality of the RF signal using each sample value and the average value of the sample values classified into each level.

Similarly, the signal quality value may be an SNR calculated using each sample value and the average value of the sample values classified into each level, the signal quality value may be an ASNR calculated using each sample value and the average value of the sample values classified into each level, and the signal quality value may be a PASNR calculated using each sample value and the average value of the sample values classified into each level.

To achieve the above and/or other aspects and advantages, embodiments of the present invention set forth an RF signal quality determining device, including a signal estimator receiving binary data of an RF signal and estimating a value of the RF signal, and a quality calculator receiving the estimated value of the RF signal and the RF signal and calculating a signal quality value representing a signal quality of the RF signal.

The signal estimator may include a predetermined type of finite impulse response (FIR) filter. In addition, the signal quality value may be an SNR calculated using the estimated value of the RF signal and the RF signal, the signal quality value may be an ASNR calculated using the estimated value of the RF signal and the RF signal, and the signal quality value may be a PASNR calculated using the estimated value of the RF signal and the RF signal.

To achieve the above and/or other aspects and advantages, embodiments of the present invention set forth a method of determining a signal quality of an RF signal, including obtaining an estimated value of the RF signal using binary data of the RF signal, and calculating a signal quality value representing the signal quality of the RF signal using the estimated value of the RF signal and the RF signal.

The obtaining of the estimated value of the RF signal may include obtaining the estimated value of the RF signal using a predetermined type of FIR filter. The signal quality value may be an SNR calculated using the estimated value of the RF signal and the RF signal, the signal quality value may be an ASNR calculated using the estimated value of the RF signal and the RF signal, and the signal quality value may be a PASNR calculated using the estimated value of the RF signal and the RF signal.

To achieve the above and/or other aspects and advantages, embodiments of the present invention set forth a recording and/or reproducing apparatus, including a signal detection unit to generate an RF signal representative of information of a medium, an RF signal quality determining device according to embodiments of the present invention, and a processing unit to record and/or reproduce information to/from the medium.

The apparatus may further include a processor performing at least one of focus compensation, tilt compensation, detrack compensation, and/or recording signal optimization, based on the signal quality value.

To achieve the above and/or other aspects and advantages, embodiments of the present invention set forth a method of recording and/or reproducing information to/from a medium, including generating an RF signal representative of information of the medium, determining a signal quality of an input RF signal using the RF signal quality determining method according to embodiments of the present invention, and recording and/or reproducing information to/from the medium.

The method may further include performing at least one of focus compensation, tilt compensation, detrack compensation, and/or recording signal optimization, based on the signal quality value.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

Figure 1:
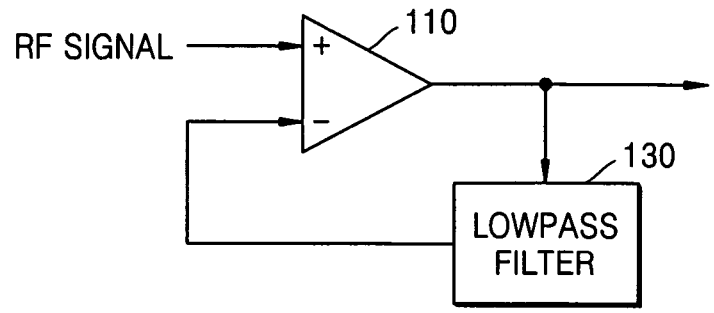
FIG. 1 is a block diagram of a conventional binarization device.
Figure 2A:
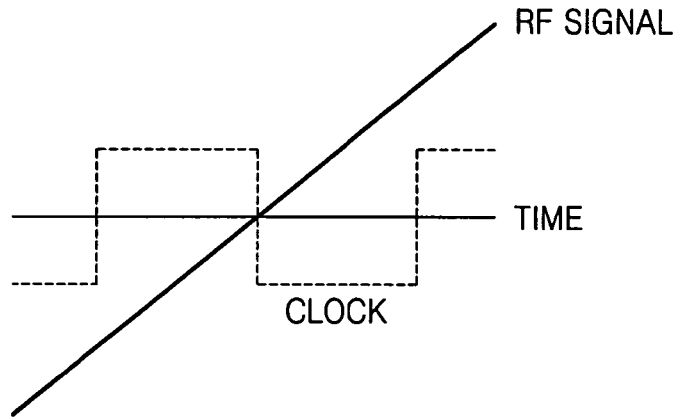
FIGS. 2A and 2B explain jitter generated according to conventional techniques.
Figure 2B:
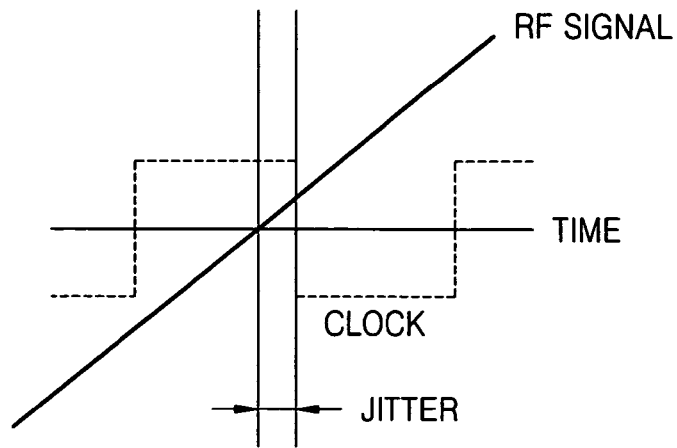

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
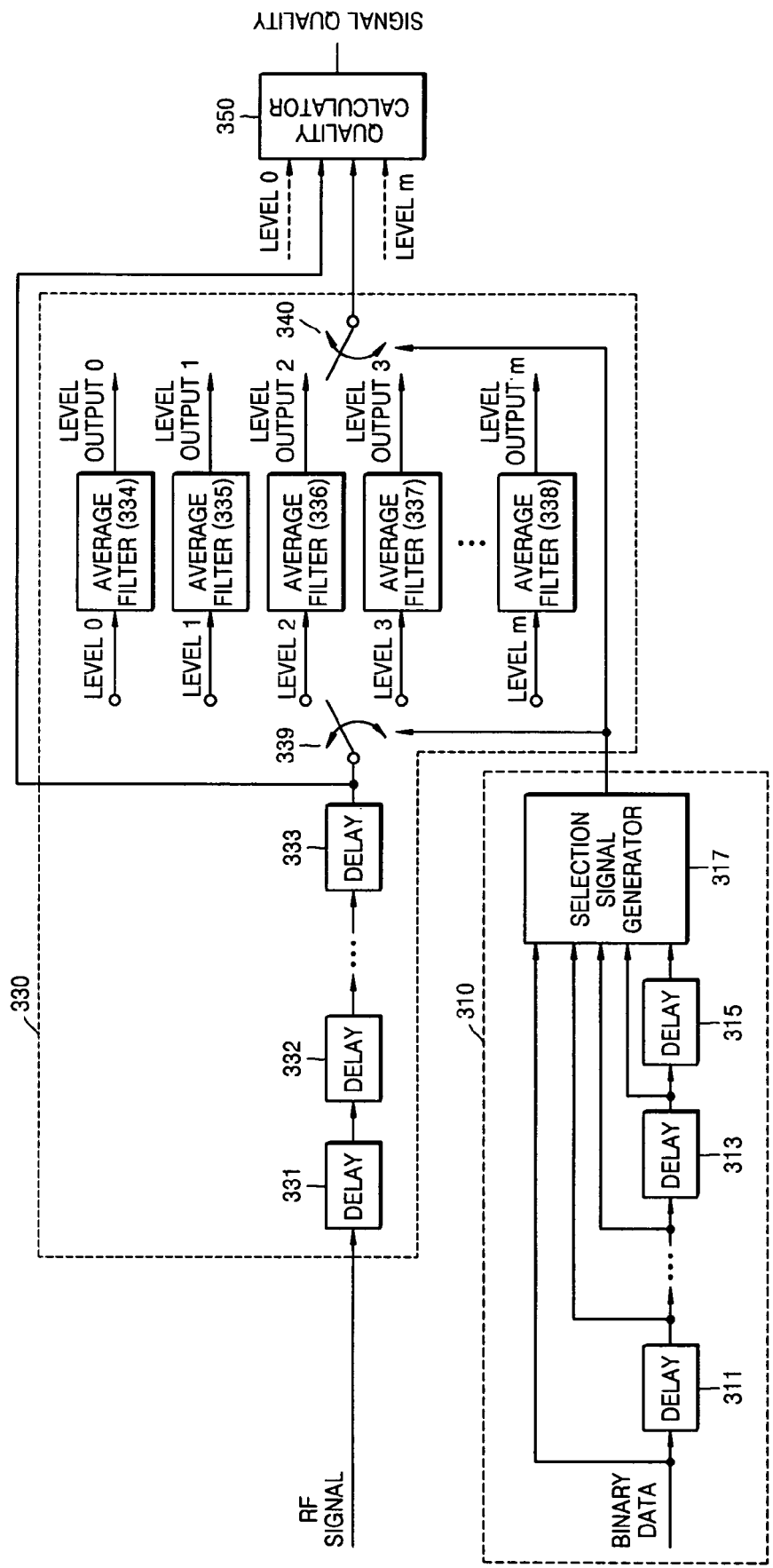
FIG. 3 is a block diagram of a signal quality determining device, according to an embodiment of the present invention.

FIG. 3 is a block diagram of a signal quality determining device, according to an embodiment of the present invention. Referring to FIG. 3, the signal quality determining device includes a signal estimator 310, a channel identifier 330, and a quality calculator 350.

Figure 6:
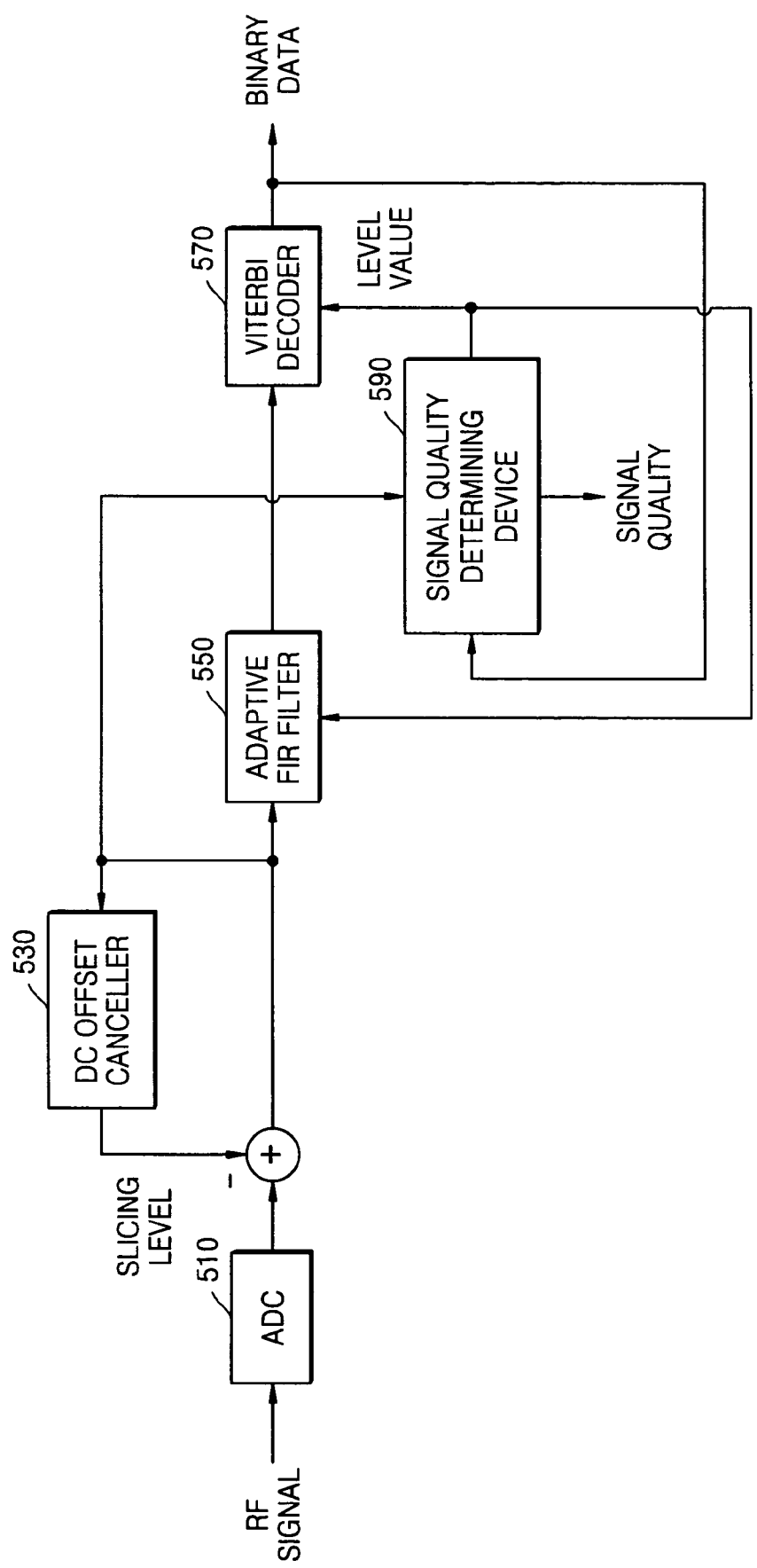
FIG. 6 is a block diagram of a binary data detecting apparatus, including a signal quality determining device, according to an embodiment of the present invention.
Figure 8:
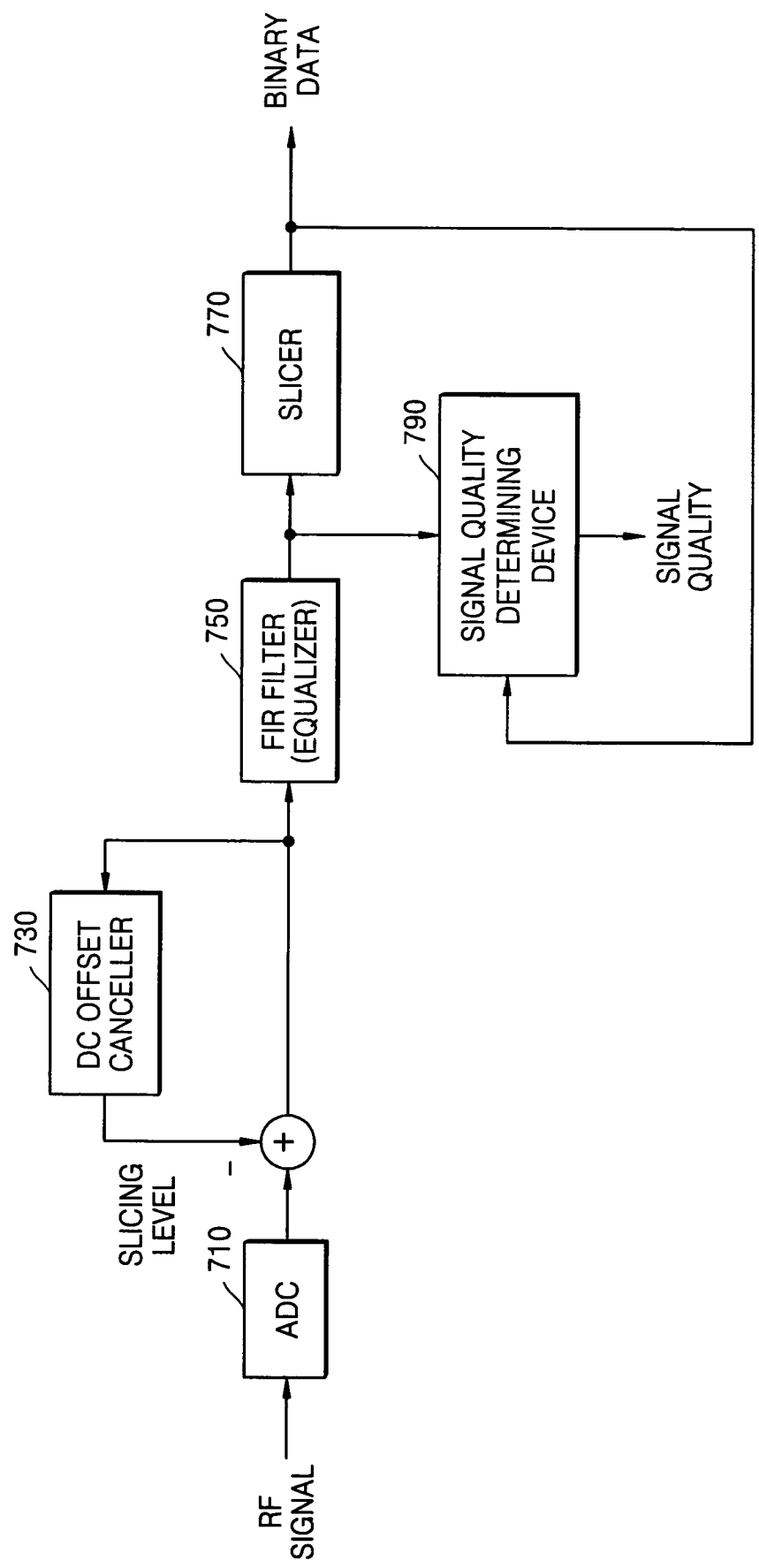
FIG. 8 is a block diagram of a binary data detecting apparatus, including a signal quality determining device, according to still another embodiment of the present invention.

The signal estimator 310 receives binary data obtained by binarizing an RF signal using a predetermined method. To obtain high quality binary data, an output of a viterbi decoder 570 may be used, as shown in FIG. 6. That is, binary data obtained by viterbi decoding the RF signal can be used as an input signal of the signal estimator 310. However, binary data to be used as an input of the signal estimator 310 may be obtained using various binarization devices. That is, an output signal of a slicer 770 may also be used as an input of the signal estimator 310, as shown in FIG. 8.

The signal estimator 310 includes a plurality of delays 311 through 315 delaying input binary data, for a time corresponding to a sampling period for the RF signal, and a selection signal generator 317 generating a selection signal to control the channel identifier 330.

Each sample value of the RF signal is classified into a plurality of levels. The channel identifier 330 classifies the sample value of the RF signal into a corresponding level according to the selection signal output from the signal estimator 310. The channel identifier 330 outputs level output 0 through level output m, which are average values of the sample values of the RF signal classified into the levels.

The selection signal generator 317 receives binary values output from each of delays 311 through 315, determines a level corresponding to each sample value of the RF signal, generates a selection signal corresponding to the determined level, and provides the selection signal to the channel identifier 330. That is, the signal estimator 310 determines a level corresponding to a sample value of the RF signal output from a delay 333 and generates a selection signal corresponding to the determined level. Based on the generated selection signal, a switch 339 outputs the sample value of the RF signal output from the delay 333 to a corresponding one of a plurality of average filters 334 through 338.

The average filters 334 through 338 output level output 0 through level output m, which are average values of the sample values of the RF signal classified into the levels. Each of the average filters 334 through 338 may be realized using a lowpass filter.

Equation 1 is an example of calculating one of level output 0 through level output m.

$$\text{Updated level=previous level+(delayed input signal-previous level)/constant} \quad \text{Equation 1:}$$

The larger the constant value of Equation 1, the smaller the amount of variation in the updated level. Accordingly, the updated level slowly follows the variation. When the level value obtained using Equation 1 is input to a viterbi decoder, a performance of the viterbi decoder can then be improved.

According to the selection signal output from the selection signal generator 317, a switch 340 outputs one of level output 0 through level output m, which are outputs of the respective average filters 334 through 338, to the quality calculator 350. Since it can be assumed that level output 0 through level output m are average values, classified into levels of an RF signal whose noise has been removed, level output 0 through level output m can be assumed to be ideal signals.

Therefore, the quality calculator 350 calculates quality of an RF signal by receiving a sample value of the RF signal and an estimation value of sample values of the RF signal, i.e., one of level output 0 through level output m.

The calculation of a signal quality value representing quality of the RF signal, which is performed by the quality calculator 350, can be realized by various methods. For example, the signal quality value can be represented with a signal to noise ratio (SNR) indicating a power ratio between an ideal signal and noise, as shown in Equation 2.

$$SNR = \Sigma(\text{ideal signal})2/\Sigma(\text{noise signal})2 \quad \text{Equation 2:}$$

Here, the ideal signal represents an estimation value of a signal, i.e., one of level output 0 through level output m. The noise signal corresponds to a difference between the estimation value of the signal and a sample value of an actual RF signal.

Since Equation 2 includes a square operation, the size of hardware necessary to perform the square operation becomes large and complex. Therefore, a peak amplitude of the RF signal may be used instead of the ideal signal. Since the peak amplitude value of RF signal is rarely changed, it is actually unnecessary to calculate the peak amplitude value for every sample. Accordingly, a large amount of hardware or execution time is not actually required. Therefore, a peak SNR (PSNR) can be used as the signal quality value, as shown in Equation 3.

$$PSNR = \Sigma(\text{peak amplitude of input signal})2/\Sigma(\text{noise signal})2 \quad \text{Equation 3:}$$

Here, the input signal represents an RF signal, with a maximum value and a minimum value of the input signal additionally being provided to the quality calculator 350 in order to obtain the peak amplitude of the input signal. In the embodiment shown in FIG. 3, a value assigned to level 0 is the minimum value, and a value assigned to level m is the maximum value.

Also, an absolute SNR (ASNR) or a peak ASNR (PASNR), respectively obtained by using only an absolute value of an ideal signal and an absolute value of a noise signal, may be used as the signal quality value. In this case, since multiply operations are unnecessary, a relatively small amount of hardware is required, resulting in calculating time being reduced.

The ASNR and the PASNR are represented below, as shown in Equations 4 and 5, respectively.

$$ASNR = \Sigma|\text{ideal signal}|/\Sigma|\text{noise signal}| \quad \text{Equation 4:}$$

$$PASNR = \Sigma|\text{peak amplitude of input signal}|/\Sigma|\text{noise signal}| \quad \text{Equation 5:}$$

An SNR is usually expressed in dB units, which are logarithmic. When a large value appears, the large value is generally converted into dB units. Therefore, when Equations 2 through 5 are expressed in dB units, they are represented as shown below, in Equations 6 through 9.

$$SNR = 10 \log 10(\Sigma(\text{ideal signal})2/\Sigma(\text{noise signal})2) \quad \text{Equation 6:}$$

$$PSNR = 10 \log 10(\Sigma(\text{peak amplitude of input signal})2/\Sigma(\text{noise signal})2) \quad \text{Equation 7:}$$

$$ASNR = 10 \log 10(\Sigma|\text{ideal signal}|/\Sigma|\text{noise signal}|) \quad \text{Equation 8:}$$

$$PASNR = 10 \log 10(\Sigma|\text{peak amplitude of input signal}|/\Sigma|\text{noise signal}|) \quad \text{Equation 9:}$$

As shown in Equations 3, 5, 7, and 9, the peak amplitude of the input signal must be obtained first. In the embodiment shown in FIG. 3, level 0 and level m are additionally provided to the quality calculator 350 in order to calculate the peak amplitude of the input signal.

Figure 4:
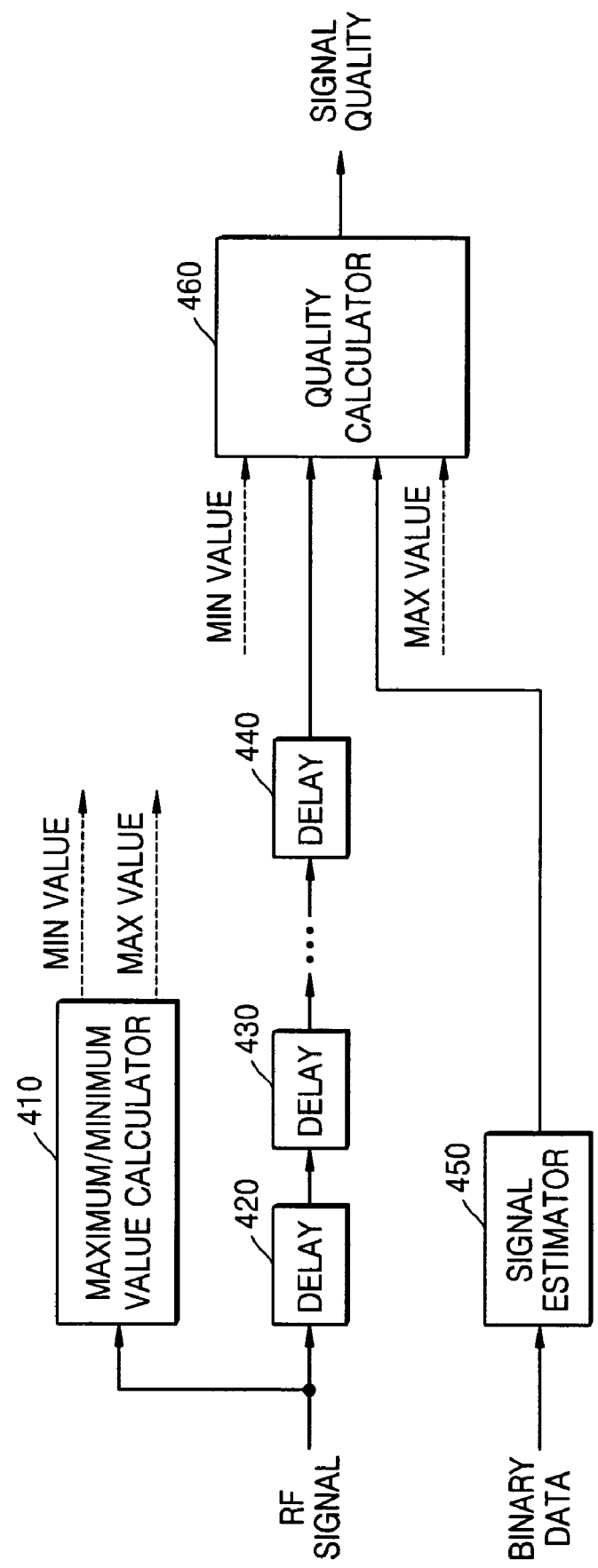
FIG. 4 is a block diagram of a signal quality determining device, according to another embodiment of the present invention.

FIG. 4 is a block diagram of a signal quality determining device, according to another embodiment of the present invention. Referring to FIG. 4, the signal quality determining device may include a maximum/minimum value calculator 410, a plurality of delays 420 through 440, a signal estimator 450, and a quality calculator 460.

The signal estimator 450 receives binary data obtained by binarizing an RF signal, using a predetermined method. To obtain high quality binary data, an output of the viterbi decoder 570 may be used, as shown in FIG. 6. That is, binary data obtained by viterbi decoding the RF signal may be used as an input signal of the signal estimator 450. However, binary data input to the signal estimator 450 may be obtained using various other binarization devices. For example, an output signal of the slicer 770 may be used as an input of the signal estimator 450, as shown in FIG. 8.

The signal estimator 450 outputs an RF signal estimated using the binary data to the quality calculator 460. The signal estimator 450 can be realized using a finite impulse response (FIR) filter. It is well known that an estimated RF signal having a plurality of level values can be obtained by inputting the binary data to a predetermined type of FIR filter, based on code types of the RF signal.

Figure 5:
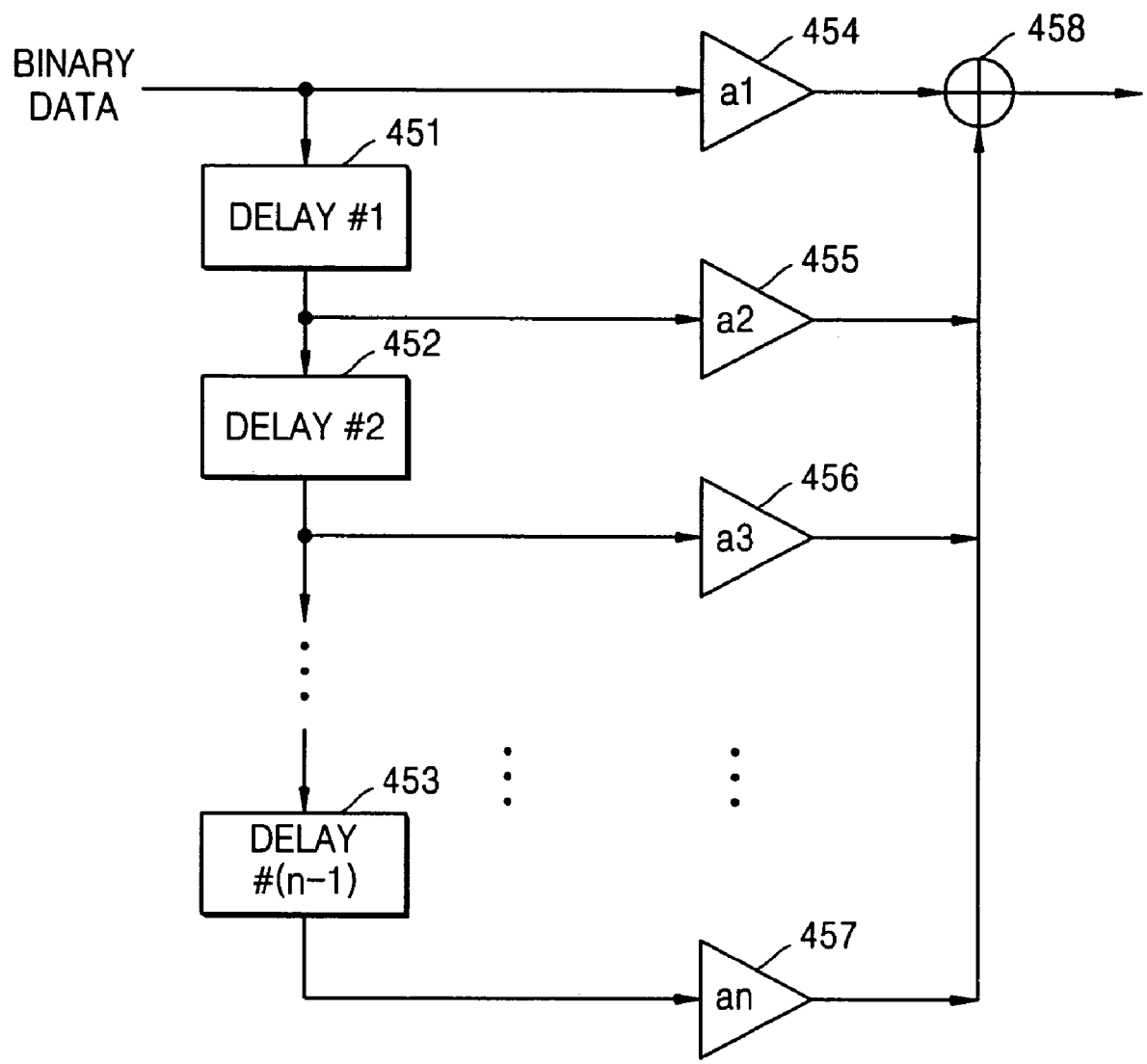
FIG. 5 is an example of an FIR filter.

FIG. 5 is an example of the FIR filter. Referring to FIG. 5, the FIR filter includes a plurality of delays 451 through 453 delaying input binary data in a system clock unit, a plurality of multipliers 454 through 457, and an adder 458 adding output values of the multipliers 454 through 457. Constants a1 through an, of the multipliers 454 through 457, are real numbers including 0. The number of delays, the number of multipliers, and the constants a1 through an, of the plurality of multiplier 454 through 457, can be determined based on code types of the RF signal.

Referring to FIG. 4, the plurality of delays 420 through 440 synchronize the estimated RF signal, output from the signal estimator 450, with the actual RF signal.

The quality calculator 460 calculates a quality value of the RF signal from the estimated RF signal, output from the signal estimator 450, and the actual RF signal synchronized with the estimated RF signal, using one of Equations 2 through 9.

According to Equations 3, 5, 7, and 9, the peak amplitude of the input signal must be obtained first. In the signal quality determining device of FIG. 4, the maximum/minimum value calculator 410 calculates a maximum value and a minimum value of the RF signal and provides the maximum and minimum values to the quality calculator 460. When the quality value of the RF signal is calculated using a method other than Equations 3, 5, 7, and 9, the maximum/minimum value calculator 410 is also unnecessary.

FIG. 6 is a block diagram of a binary data detecting apparatus including a signal quality determining device 590, for example, according to an embodiment of the present invention. Referring to FIG. 6, the binary data detecting apparatus may include an analog-to-digital converter (ADC) 510, a direct current (DC) offset canceller 530, an adaptive FIR filter 550, the viterbi decoder 570, and the signal quality determining device 590, according to an embodiment of the present invention.

The ADC 510 samples an RF signal in a predetermined period and outputs the sampled RF signal. The DC offset canceller 530 receives the sampled RF signal output from the ADC 510 and cancels a DC offset value. In general, since the viterbi decoder 570 is designed with the assumption that there is a constant channel characteristic, the adaptive FIR filter 550 is used to adjust a channel characteristic of a signal input to the viterbi decoder 570.

The viterbi decoder 570 obtains binary data with few errors considering a statistical characteristic of the RF signal using level values of the RF signal.

The signal quality determining devices shown in FIG. 3 or 4 can be used as the signal quality determining device 590. However, in this arrangement, since an optimal level value is needed by the viterbi decoder 570, in order to improve the quality of a reproducing signal, it may be more preferable that the signal quality determining device shown in FIG. 3 is used.

Figure 7:
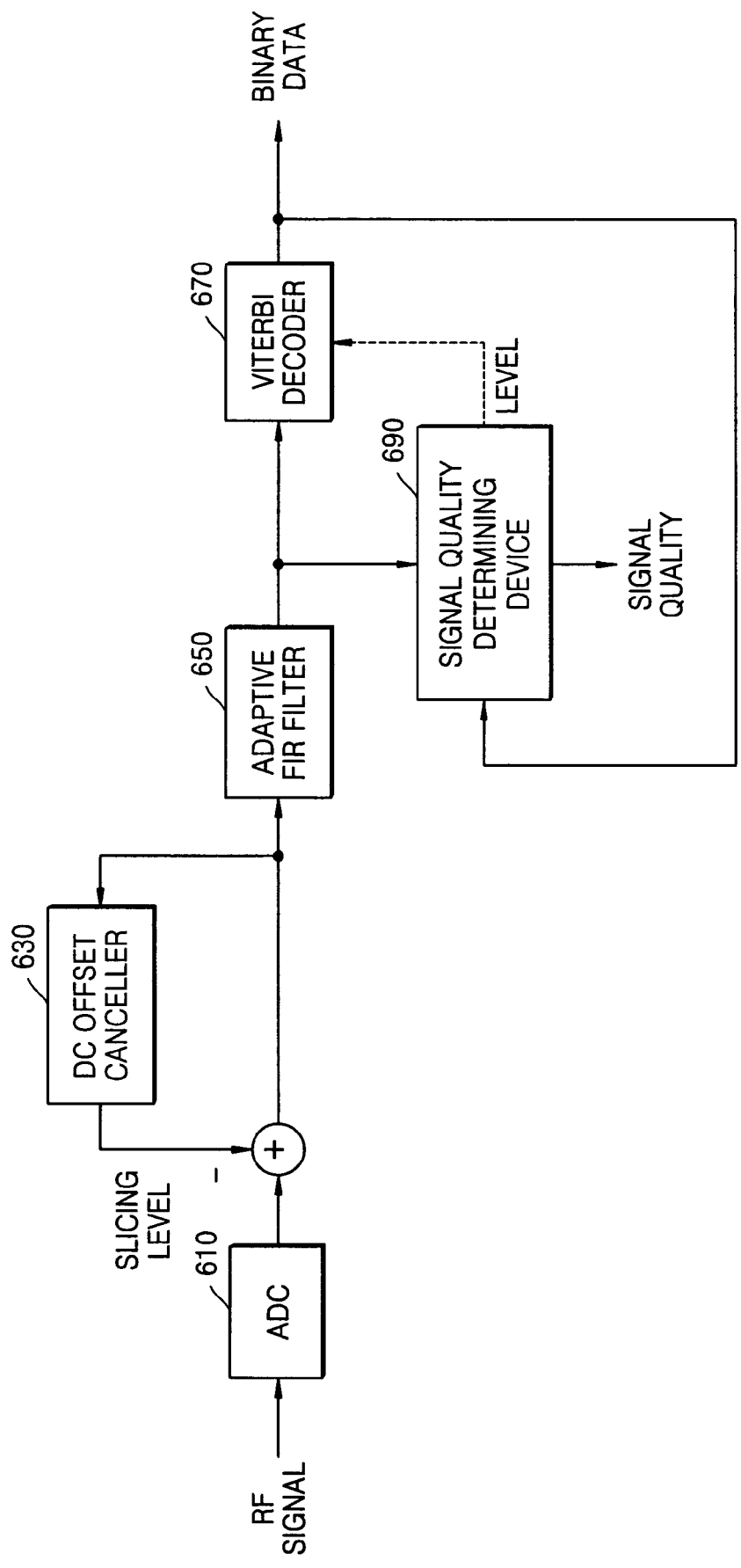
FIG. 7 is a block diagram of a binary data detecting apparatus, including a signal quality determining device, according to another embodiment of the present invention.

FIG. 7 is a block diagram of the binary data detecting apparatus, including a signal quality determining device 690, according to another embodiment of the present invention. In the binary data detecting apparatus shown in FIG. 7, since it can be assumed that a channel characteristic of a signal output from an adaptive FIR filter 650 is fixed, it may be more preferable in this arrangement for the signal quality determining device of FIG. 4 be used, rather than the signal quality determining device of FIG. 3, as the signal quality determining device 690. However, if the signal quality determining device of FIG. 3 is used, optimal performance can still be obtained by obtaining an optimal level, using the signal quality determining device shown of FIG. 3 and inputting the optimal level to a viterbi decoder 670.

FIG. 8 is a block diagram of the binary data detecting apparatus, including a signal quality determining device 790, according to another embodiment of the present invention. The binary data detecting apparatus uses another binarization device, other than the viterbi decoder, to detect binary data. A simple slicer discriminating a sign of an RF signal or a run length corrector having a structure that removes a binary signal not suitable for a code condition, based on the code condition of the binary signal, can be used as the binarization device. The binary data detecting apparatus shown of FIG. 8, as illustrated, adopts a slicer 770.

In the binary data detecting apparatus shown in FIG. 8, since the estimation of an RF signal may be required to be more exact, it may be more preferable to use the signal quality determining device of FIG. 3, in this arrangement. However, the signal quality determining device of FIG. 4 can also be used.

Figure 9:
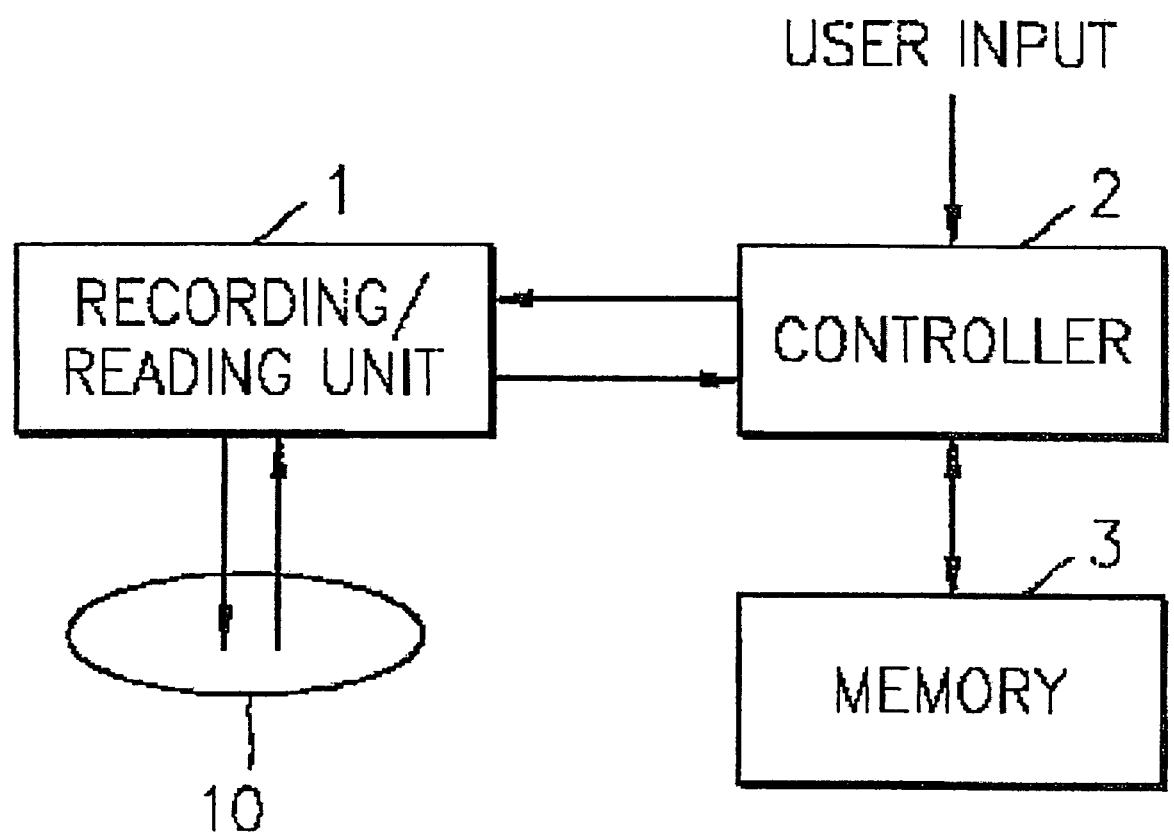
FIG. 9 illustrates a recording and/or reproducing apparatus implementing embodiments of the present invention.

As described above, according to embodiments of the present invention, the quality of an RF signal reproduced from an optical disc can be exactly determined. Accordingly, such a quality of the RF signal can be implemented in the aforementioned recording and/or reproducing apparatus, for example. FIG. 9 is a block diagram of a recording and/or reproducing apparatus. Referring to FIG. 9, the recording and/or reproducing apparatus may include a recording/reading unit 1, e.g., a pickup, a controller 2, and a memory 3. The recording/reading unit 1 records/reproduces data on an optical disc 10, according to embodiments of the present invention.

Similarly, focus compensation, tilt compensation, detrack compensation, and recording signal optimization can also be performed using a quality calculation value representing the quality of the RF signal, e.g., in the recording and/or reproducing apparatus of FIG. 9.

The focus compensation can be performed by measuring the quality of signals obtained from various focusing positions using a micro computer and adjusting the focus to a position at which optimal quality is obtained. The tilt compensation, the detrack compensation, and the recording signal optimization can also be performed using similar methods. Also, when a method of determining the quality of the RF signal, using an absolute value of the RF signal and an absolute value of an estimated RF signal is used, the size of hardware can be small, and a calculation process can be simple.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An RF signal quality determining device, comprising:
   a signal estimator receiving binary data of an RF signal and estimating a value of the RF signal;
   a maximum/minimum value calculator receiving the RF signal and calculating a maximum value and a minimum value of the RF signal; and
   a quality calculator receiving the estimated value of the RF signal, the RF signal, the maximum value of the RF signal, and the minimum value of the RF signal and calculating a signal quality value representing a signal quality of the RF signal.

2. The device of claim 1, wherein the signal estimator comprises a predetermined type of finite impulse response (FIR) filter.

3. The device of claim 1, wherein the signal quality value is a signal to noise ratio (SNR) calculated using the estimated value of the RF signal and the RF signal.

4. The device of claim 1, wherein the signal quality value is an absolute signal to noise ratio (ASNR) calculated using the estimated value of the RF signal and the RF signal.

5. The device of claim 1, wherein the signal quality value is a peak absolute signal to noise ratio calculated using the estimated value of the RF signal and the RF signal.

6. The device of claim 1, wherein the binary data is obtained by viterbi decoding the RF signal.

7. A recording and/or reproducing apparatus, comprising:
   a signal detection unit to generate an RF signal representative of information of a medium;
   the RF signal quality determining device of claim 1; and
   a processing unit to record and/or reproduce information to/from the medium according to the determined signal quality of the RF signal.

8. The apparatus of claim 7, further comprising a processor performing at least one of focus compensation, tilt compensation, detrack compensation, and/or recording signal optimization, based on the signal quality value.

9. A method of determining a signal quality of an RF signal, the method comprising:

obtaining an estimated value of the RF signal using binary data of the RF signal;

calculating a maximum value of the RF signal and a minimum value of the RF signal;

calculating a signal quality value representing the signal quality of the RF signal using the estimated value of the RF signal, the RF signal, the maximum value of the RF signal, and the minimum value of the RF signal.

10. The method of claim 9, wherein the obtaining of the estimated value of the RF signal comprises obtaining the estimated value of the RF signal using a predetermined type of finite impulse response (FIR) filter.

11. The method of claim 9, wherein the signal quality value is a signal to noise ratio (SNR) calculated using the estimated value of the RF signal and the RF signal.

12. The method of claim 9, wherein the signal quality value is an absolute signal to noise ratio (ASNR) calculated using the estimated value of the RF signal and the RF signal.

13. The method of claim 9, wherein the signal quality value is a peak absolute signal to noise ratio (PASNR) calculated using the estimated value of the RF signal, the RF signal, the maximum value of the RF signal, and the minimum value of the RF signal.

14. The method of claim 9, wherein the binary data is obtained by viterbi decoding the RF signal.

15. A method of recording and/or reproducing information to/from a medium, comprising:

generating an RF signal representative of information of the medium;

determining a signal quality of the RF signal using the RF signal quality determining method of claim 9; and recording and/or reproducing information to/from the medium according to the determined signal quality of the RF signal.

16. The method of claim 15, further comprising performing at least one of focus compensation, tilt compensation, detrack compensation, and/or recording signal optimization, based on the signal quality value.

* * * * *